United States Patent [19]

Hwang

[11] Patent Number: 4,583,802

[45] Date of Patent: Apr. 22, 1986

[54] DECORATION BOARD FOR ELECTRIC WIRE LAID

[76] Inventor: Jen F. Hwang, 25-1, Alley 4, Lane 133, Sec. 4, Nanking East Rd., Taipei, Taiwan

[21] Appl. No.: 578,852

[22] Filed: Feb. 10, 1984

[51] Int. Cl.⁴ .......................... H01R 9/00; H01R 9/16
[52] U.S. Cl. ........................................ 339/20; 339/23
[58] Field of Search ....................... 174/97, 103, 101; 339/20, 21 R, 22 R, 23, 22 B

[56] References Cited

U.S. PATENT DOCUMENTS

| | | | |
|---|---|---|---|
| 2,175,144 | 10/1939 | Davison | 339/23 |
| 2,313,960 | 3/1943 | O'Brien | 339/22 R |
| 2,441,698 | 5/1948 | Gerspacher et al. | 174/101 |
| 3,018,463 | 1/1962 | Cataldo | 339/22 R |
| 3,044,036 | 7/1962 | Herrman | 339/22 B |
| 3,171,702 | 3/1965 | Schumacher et al. | 174/101 |
| 3,262,083 | 7/1966 | Gooding | 339/23 |
| 3,461,220 | 8/1969 | Hukin | 339/23 |
| 3,786,171 | 1/1974 | Shira | 174/97 |
| 3,821,688 | 6/1974 | Larsile | 174/101 |
| 4,017,137 | 4/1977 | Parks | 339/21 R |

FOREIGN PATENT DOCUMENTS 1284615  1/1961  France ........................... 174/97

Primary Examiner—Gil Weidenfeld
Assistant Examiner—Thomas M. Kline
Attorney, Agent, or Firm—Balogh, Osann, Kramer, Dvorak, Genova & Traub

[57] ABSTRACT

A decoration board for concealing electric wires laid indoors, having a wire-laying board formed with partially formed wire-receiving grooves and an engaging board formed with partially formed wire-receiving grooves, the two boards secured together defining wire-receiving conduits. The decoration board is formed in sections which can be connected together by a board joint, inner angle board joint and external angle joint. The board joint may be provided with an opening for receiving an electrical receptacle.

5 Claims, 4 Drawing Figures

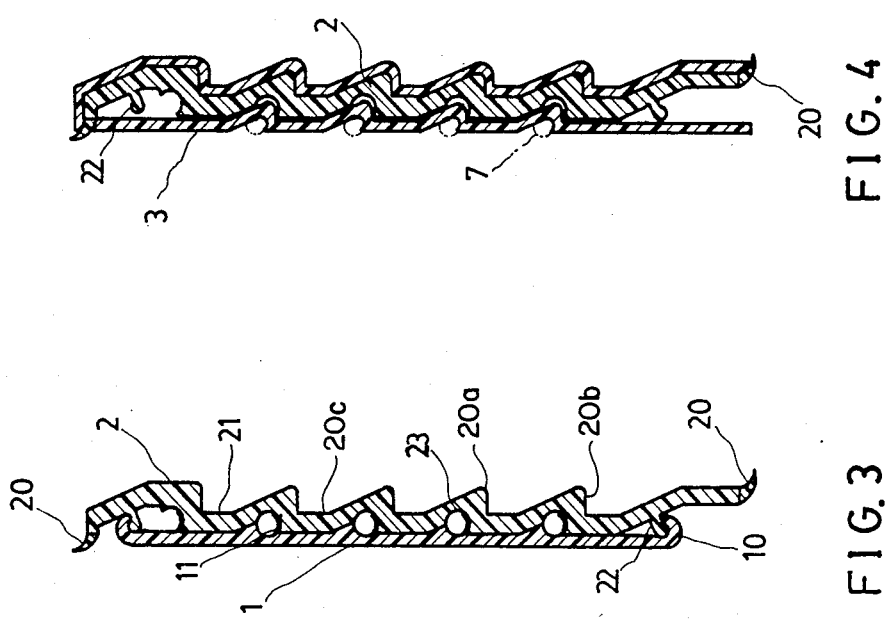

DECORATION BOARD FOR ELECTRIC WIRE LAID

BACKGROUND OF THE INVENTION

This invention relates to a decoration board, particularly a decoration board used for concealing electric wires laid indoors. Today, in some rooms, electric wires are usually laid in a disordered manner, which not only reduces the beautiful appearance of the room, but also can give rise to a fire hazard. Currently, a means has been developed to improve that situation, i.e., a skirt board, in which a central groove is furnished to house the wires; unfortunately, since all the wires are laid in one groove, the possibility of fire hazard still exists. If one wire is set on fire as a result of a short-circuit, the other wires will also be set on fire. In other words, the possibility of a fire hazard will surely be increased.

SUMMARY OF THE INVENTION

In view of the aforesaid facts, the inventor has developed a decoration board for electric wires laid indoors, which board not only solves the safety problem, but also fulfils the beautiful appearance requirement in a room. The feature of the present invention is to use two pieces of engaging boards to form a number of pipe-shaped cylinders, in which wires may be laid respectively for safety purpose. The outer surface of the board is formed into a saw-tooth shape, which tucks away the fastening nails, and also presents an elegant appearance in the room.

BRIEF DESCRIPTION OF THE DRAWINGS

FIG. 3 is a sectional view of the wire-laying board and the engaging board assembled together.

FIG. 4 is a sectional view of the engagement between the engaging board and the board joint, and between the inner (outer) elbow board joint and the receptacle installing board.

DETAILED DESCRIPTION

Figure 1:
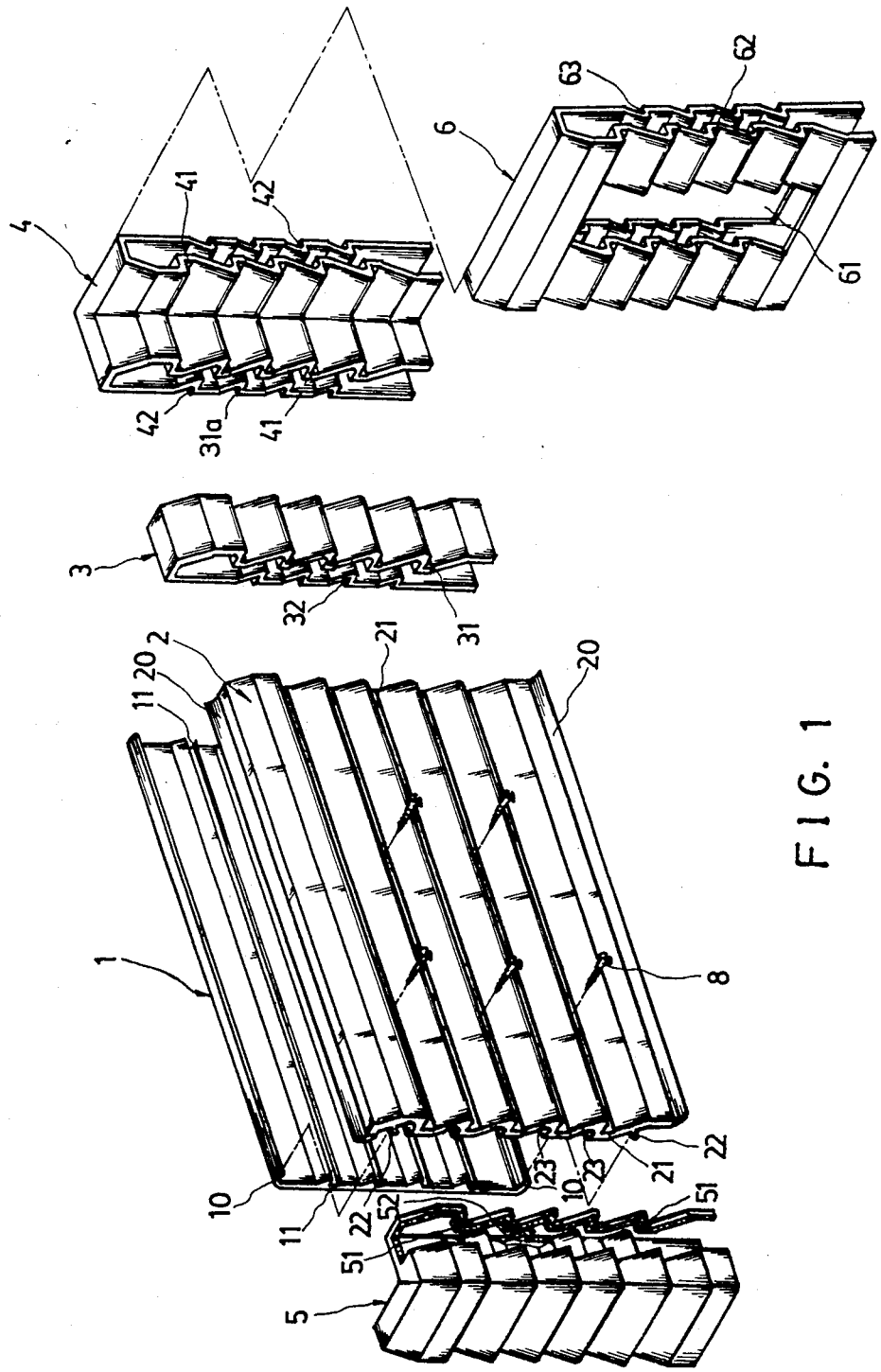
FIG. 1 is an exploded and perspective view of the present invention.

FIG. 1 illustrates an exploded and perspective view of the present invention. FIG. 3 illustrates a sectional view of the wire-laying board and an engaging board assembled together. At top and bottom of a wire-laying board 1, there is a flange 10 respectively; between that two flanges, there are furnished a number of spaced wire-laying channels 11. At top and bottom of a saw-tooth-shaped engaging board 2, there is furnished a soft sealing strip 20, of which the top one is bent inwardly, while the bottom one is bent outwardly. The Horizontal saw-tooth-shaped strips 20a between the two soft sealing strips 20 each have a perpendicular side 20b to the engaging board 2 and a parallel side 20c to the engaging board 2 so as to form a tucked nail groove 21. At the top and bottom and on the back side of the engaging board 2, an engaging flange 22 is furnished respectively so as to fit with the engaging flange 10 of the wire-laying board 1. The upper engaging flanges 22 of the engaging board 2 are slightly bent upwardly and the lower flanges 22 are slightly bent downwardly. A round channel 23 on the engaging board 2 has an open portion at its upper left corner. As shown in FIG. 1, between the teeth on the front of the board joint 3, there are furnished tucked nail grooves 31. Grooves 31a on the rear of the board joint 3 are used as wire channels 32. An internal angle board joint 4 includes a saw-tooth-shaped front board and a rear board being moulded in one piece from the top end; the grooves between the teeth on the front board are used as a tucked nail groove 41, while the grooves between the teeth one the rear board are used as wire channels 42. Further, an external angle board joint 5 includes a saw-tooth-shaped front board and a board being moulded in one piece from the top end; grooves between the teeth on the front board are used as tucked nail grooves 51, while grooves between the teeth on the rear board are used as wire channels 52. A receptacle installing board 6 is made of two pieces of saw-tooth-shaped boards being moulded in one piece from the top end; a slot in the central portion of the front and rear boards of the receptacle installing board 6 is used as the receptacle hole 61. Between two teeth on the front board of the receptacle installing board 6, there are furnished tucked nail grooves 62; the grooves on the rear board define wire channels 63.

Figure 2:
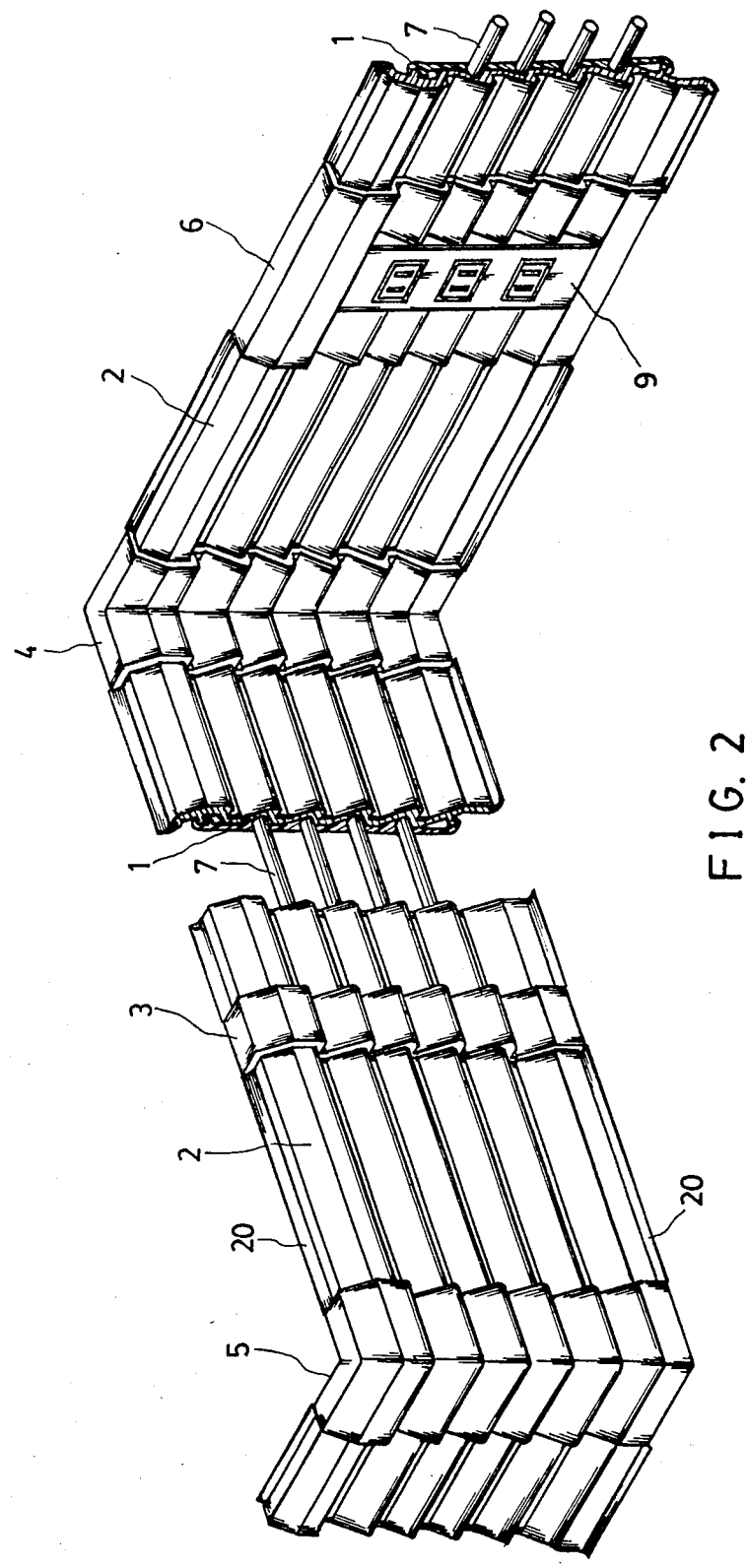
FIG. 2 is a perspective view of the present invention.

FIG. 2 is a perspective view of the present invention, as assembled. Upon installing the present invention along a wall, the wire-laying board 1 is secured with an adhesive or nail to a wall surface first, and then wires 7 are placed in the wirelaying channels 23; then, the engaging board 2 is placed over the wire-laying board 11 wire-laying channel 11 and the covering channel 23 are assembled together to form into a cylinder to lay a wire 7. Simultaneously, the engaging flange 10 of the wire-laying board 1 and the engaging flange 22 of the engaging board 2 will be engaged with each other so as to attach the engaging board 2 to the wire-laying board 1. In order to have the engaging board 2 firmly attached to the wire-laying board 1, a number of screws 8 may be used to fix the engaging board 2 to the wire-laying board 1 along the tucked nail grooves 21 at a suitable height. In case of trouble-shooting, just remove the screws 8 and the engaging board 2. The top and bottom soft sealing strips 20 on the engaging board 2 will closely attach to the wall and floor respectively.

Referring to FIG. 4, there is a sectional view showing the way of engagements between the engaging board 2 and the board joint 3. For the joint on a flat surface, the board joint 3 may be used to cover the two ends, which are a little longer than those of the wire-laying boards, of two engaging boards 2; in that case, the wire 7 will be inserted into the wire channel 32 on the rear board of the board joint 3. In case of a joint being an internal angle of wall, FIG. 1, an internal angle board joint 4 may be used to cover the two ends, which are a little longer than those of the wire-laying boards 1, of the two engaging boards 2; the wire 7 will be inserted into the wire channel 42 on the back side of the rear board of the internal angle board joint 4. In case of a joint being an external angle of wall, FIG. 1, an external angle board joint 5 may be used to cover the two ends, which are a little longer than those of the wire-laying boards 1, of the two engaging boards 2; the wire 7 will be inserted into the wire channel 52 on the back side of the rear board of the external angle board joint 5. In case of a joint being along a flat wall surface, a receptacle 9 will be installed in the receptacle hole 61 on the receptacle installing board 6, while the wire 7 will be inserted into the wire channel 63 on the back side of the rear board of the receptacle installing board 6. In that case, both ends of the receptacle installing board 6 will cover the two ends, which are a little longer than those of the wire-laying boards 1, of the two engaging boards 2.

In the present invention, a round conduit formed by the wire-laying round channel 11 and the covering channel 23 is used for laying the wire. Moreover, in case of one wire having a short-circuit, the rest adjacent wires would not be affected because of the spaced round wire channels providing additional protection for each wire in the boards. The nail grooves 21 on various levels on the engaging board 2 can tucked away the screws from view, i.e. increasing the beauty of the board. Since the upper and the lower soft sealing strips 20 of the engaging board 2 can closely be attached to the wall surface and the floor surface respectively, no water and dust will enter into the area covered by the present invention.

I claim:

1. An indoor decoration board for concealing electric wire laid along a wall of a room, each section of said board comprising a wire-laying board which is a thin and long flat board having upper and lower portions provided with curving flanges, and a plurality of spaced wire-laying grooves extending in an area between said upper and lower portions, an engaging board which is a long saw-tooth shaped board having upper and lower portions furnished with soft sealing strips, one of which projects inwardly and the other outwardly of the wire-laying board, said strips being integrally formed with said engaging board, the upper and lower portions of said engaging board also being provided with curved flanges, said engaging board having an exterior surface provided with elongated spaced saw-teeth disposed between said upper and lower portions, said engaging board having an inner surface provided with a plurality of elongated spaced wire-laying grooves which, in conjunction with the wire-laying grooves in the wire-laying board, define a corresponding plurality of conduits for receiving electric wires, a number of tucked nail grooves disposed underneath the saw-teeth for accommodating fastening means, said fastening means projecting through said engaging board and said wire-laying board so as to secure said decoration board to said wall, and joint means for connecting together abutting ends of said sections.

2. A decoration board according to claim 1, wherein said joint means comprises a board joint, said joint includes a saw-tooth shaped front board and a rear board joined together at the upper portions of said boards, said front board having an exterior surface provided with saw-teeth adapted to conform with the saw-teeth on said engaging board, and said rear board having an exterior surface provided with indented saw-teeth serving as wire channels.

3. A decoration board according to claim 1, wherein said joint means comprises an inner angle board joint having a saw-tooth shaped front board and a rear board joined together at right angles at the tops thereof, a number of tucked nail grooves disposed on the front board, said rear board having indented saw-tooth channels forming wire-receiving channels.

4. A decoration board according to claim 1, wherein said joint means comprises an external angle board joint having a saw-tooth front board and a rear board joined together at right angles at the tops thereof, a number of tucked nail grooves disposed on the front board, said rear board having indented saw-tooth channels forming wire-receiving channels.

5. A decoration board according to claim 1, including a receptacle installing board having a saw-tooth front board and a rear board being joined together at right angles at the tops thereof, a number of tucked nail grooves disposed on the front board, said rear board having indented saw-tooth channels forming wire-receiving channels, central portions of said front and rear boards defining an opening for receiving an electrical receptacle.

* * * * *